United States Patent
Hsieh et al.

(10) Patent No.: US 10,113,620 B2
(45) Date of Patent: Oct. 30, 2018

(54) BALL RETURNING CIRCULATOR OF BALL SCREW

(71) Applicant: Pmi Precision Motion Industries, Inc., Taichung (TW)

(72) Inventors: Wen-Ho Hsieh, Taichung (TW); Mei-Yen Chen, Taichung (TW)

(73) Assignee: PMI PRECISION MOTION INDUSTRIES, INC., Taichung (TW)

( * ) Notice: Subject to any disclaimer, the term of this patent is extended or adjusted under 35 U.S.C. 154(b) by 341 days.

(21) Appl. No.: 14/969,725

(22) Filed: Dec. 15, 2015

(65) Prior Publication Data
US 2016/0223058 A1     Aug. 4, 2016

(30) Foreign Application Priority Data
Jan. 29, 2015   (TW) .............................. 104102957 A

(51) Int. Cl.
*F16H 25/22*     (2006.01)

(52) U.S. Cl.
CPC ................................ *F16H 25/2223* (2013.01)

(58) Field of Classification Search
CPC .......................... F16H 25/2214; F16H 25/2219
See application file for complete search history.

(56) References Cited

U.S. PATENT DOCUMENTS

| | | | |
|---|---|---|---|
| 3,143,896 A | | 8/1964 | Edwards |
| 3,661,030 A | * | 5/1972 | Gagne ................. F16H 25/2214 74/424.83 |
| 5,373,755 A | * | 12/1994 | Rohlinger ............ F16H 25/2214 74/424.86 |
| 2003/0062719 A1 | * | 4/2003 | Chiu .................... F16H 25/2214 285/134.1 |
| 2003/0213323 A1 | * | 11/2003 | Hayashi .............. F16H 25/2214 74/424.87 |
| 2005/0016308 A1 | * | 1/2005 | Hayashi .............. F16H 25/2214 74/424.86 |
| 2005/0252321 A1 | * | 11/2005 | Hartig .................. B62D 5/0448 74/89.23 |
| 2009/0013811 A1 | * | 1/2009 | Hsu ..................... F16H 25/2214 74/424.87 |
| 2009/0071272 A1 | * | 3/2009 | Lin ...................... F16H 25/2214 74/89.44 |
| 2010/0170359 A1 | * | 7/2010 | Chen ................... F16H 25/2214 74/424.83 |
| 2014/0224052 A1 | * | 8/2014 | Chen ................... F16H 25/2214 74/424.86 |

FOREIGN PATENT DOCUMENTS

TW            201020421 A     6/2010

* cited by examiner

*Primary Examiner* — Terence Boes
(74) *Attorney, Agent, or Firm* — Muncy, Geissler, Olds & Lowe, P.C.

(57) ABSTRACT

A ball returning circulator of a ball screw having a nut, a screw and a plurality of balls and a circulation device assembled in a ball rolling duct defined by a nut and a screw are provided. The ball returning circulator includes: at least one ball access port, each of the at least one ball access port at one end of the circulator for releasing balls to come into or out from the circulator; and at least one curved section having at least one opening distanced from the ball access port and at least one cover plate for closing the at least one opening.

8 Claims, 9 Drawing Sheets

BALL RETURNING CIRCULATOR OF BALL SCREW

BACKGROUND OF INVENTION

1. Field of Invention

The present invention relates to a circulation structure of a ball screw, and more particularly relates to a ball returning circulator of a ball screw.

2. Related Prior Art

The structure of a conventional circulation tube of a ball screw has been developed into a variety of types, however, there are still problems and defects.

For example, the circulation tube is in a curved tubular shape, and the entire structure of the circulation tube is difficult to be manufactured by using the plastic injection molding method. Therefore, the conventional circulation tube is usually manufactured into a two-piece structure. After each half tube is molded and finished individually, the two halves can be combined as a complete circulation tube. One prior art, TW 097145688 discloses that a circulation tube is combined by two members. However, in practical application experience, the robust level of this conventional structure is not ideal because the two members are partially combined by using holes to clamp columns therebetween. Therefore, when the two members are hit by rolling balls, the combination structure of the two members is often easily loosened, and the two members may be divided, which will affect the smoothness of the rolling process of the rolling balls.

Another prior art, U.S. Pat. No. 3,143,896A discloses a circulation tube structure of a ball screw, which is constructed by two half-tube as an upper part and a lower part. Both sides of the upper part have flanges forming holes for bolts locking and positioning. However, in practical application experiences, the flanges are directly connected to both sides of the half-tube, when the half-tube is operated under pressure and vibration, those forces will be transmitted directly to the flanges, and the locking bolts are easily vibrated and loosened.

Therefore, how to develop a new structure to resolve the above mentioned problems existed in the conventional circulation tube of the ball screw is still the goal the related industries needs to strive toward.

SUMMARY OF INVENTION

The main object of the present invention is to provide a ball returning circulator of a ball screw having a nut, a screw and a plurality of balls, which is assembled on a corresponding position of a ball rolling duct preset by the nut the screw.

To achieve the above and other objects, the present invention provides a ball returning circulator of a ball screw having a nut, a screw and a plurality of balls, including: at least one ball access port, each of the at least one ball access port at one end of the circulator for releasing balls to come into or out from the circulator; and at least one curved section having at least one opening distanced from the ball access port and at least one cover plate for closing the at least one opening.

Another object of the present invention is to provide a circulation device assembled in a ball rolling duct defined by a nut and a screw, the circulation device including: a circulator having at least one curved section; at least one opening formed on the curved section; and at least one cover plate assembled onto the curved section for closing the at least one opening.

The main effects and advantages of the present invention are that the force-resisting strength of the ball returning circulator of the ball screw can be greatly increased, and then the durability and quality of the ball returning circulator are effectively improved.

The present invention will become more obvious from the following description when taken in connection with the accompanying drawings, which show, for purpose of illustrations only, the preferred embodiment(s) in accordance with the present invention.

DETAILED DESCRIPTION

Figure 1:
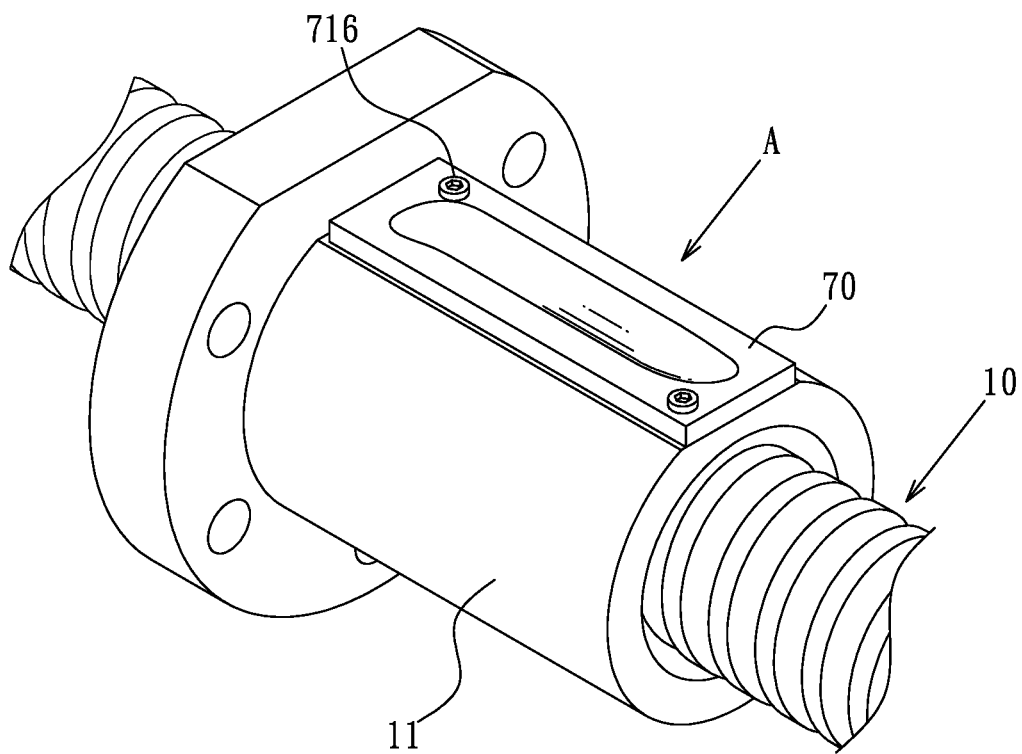
FIG. 1 is a perspective view of a preferred embodiment of the present invention.

With reference to FIGS. 1-3, 3A and 4-6, those structures are preferred embodiments of a circulation device and a ball returning circulator of a ball screw of the present invention. These embodiments are provided for illustrative purposes only, all of the structures are not limited in this patent application. The circulation device A is assembled on a corresponding position of a ball rolling duct 12 preset by a nut 11 and a screw 10. The circulation device A includes a ball returning circulator 2 having at least one curved section 23, 23'; at least one opening 30, 30' formed on the curved section 23, 23' of the circulation tube 20, 20'; and at least one cover plate 40, 40' assembled onto the curved section 23, 23' for closing the opening 30, 30'.

In this embodiment, the ball returning circulator 2 may be provided with several components. As shown in FIGS. 1-3, 3A and 4-6, the ball returning circulator 2 includes: at least one ball access port 24, 24', each of the at least one ball access port 24, 24' is provided at one end of the circulator 2 for releasing balls (not shown) to come into or out from the circulator 2; and at least one curved section 23, 23' (Note: in this embodiment, the circulation tube can be in L-shaped, arc-shaped, V-shaped or other curved shape) has at least one opening 30, 30' distanced from the ball access port 24, 24' and at least one cover plate 40, 40' for closing the at least one opening 30, 30'. In this embodiment, the ball returning circulator 2 comprises two circulation tubes 20, 20'. Each said circulation tube 20, 20' has one said ball access port 24, 24', a connecting section 21, 21', one said curved section 23, 23' and a ball engaging section 22, 22', wherein each said curved section 23, 23' having the opening 30, 30' is between the connecting section 21, 21' and the ball engaging section 22, 22'.

Figure 10:
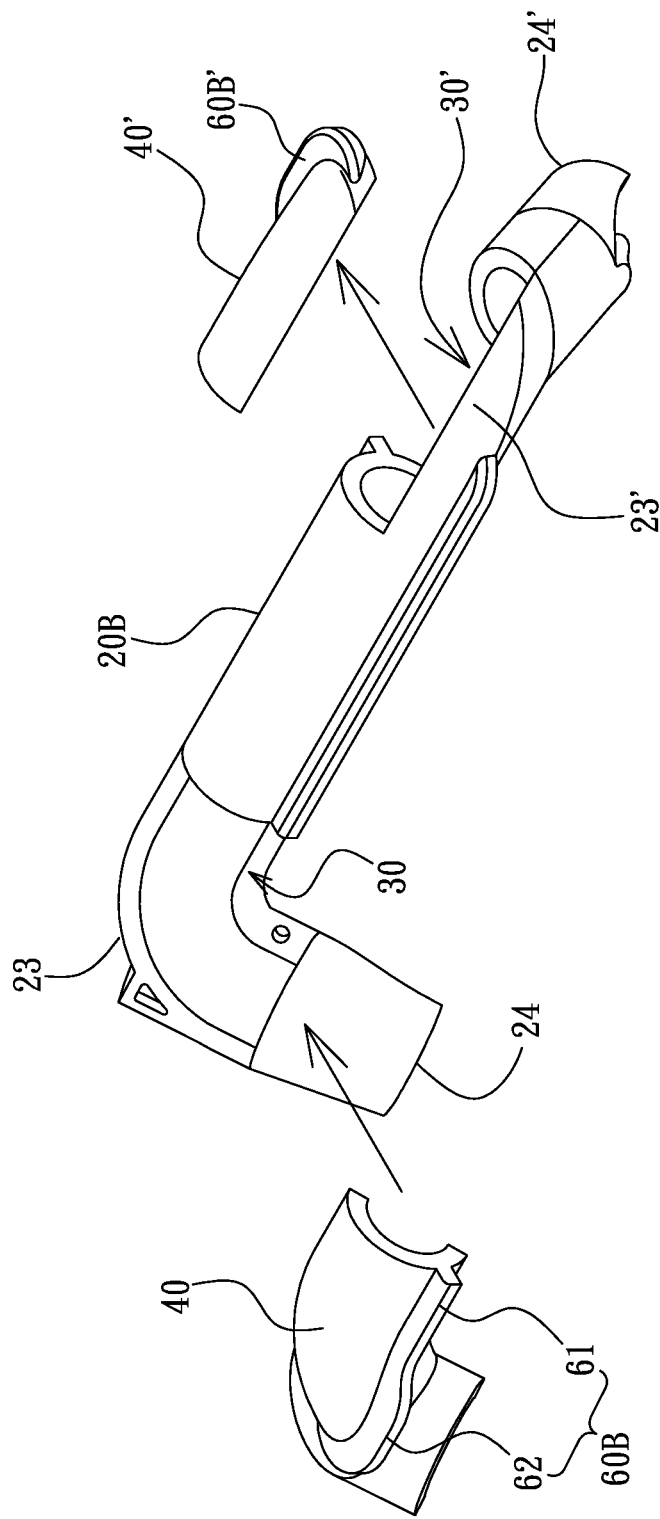
FIG. 10 is a view showing another embodiment of the circulation tube of the present invention.

In another embodiment as shown in FIG. 10, the ball returning circulator may be integrally formed as a single piece. The difference between this embodiment and the preceding embodiment is that a circulation tube 20B is formed without the connecting section.

Figure 9:
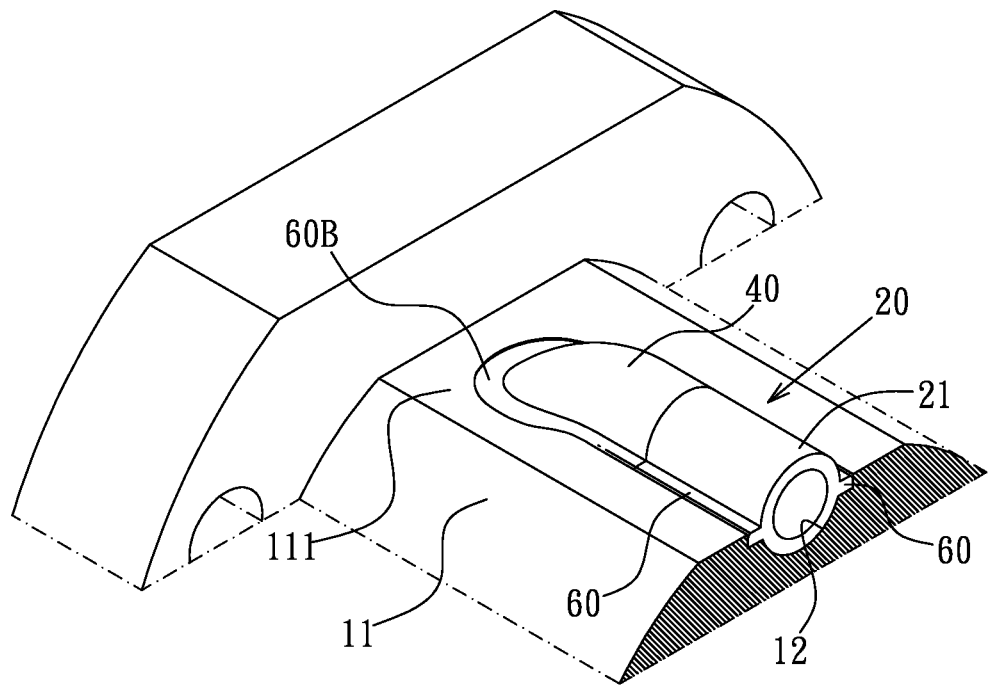
FIG. 9 is a view showing a positioning wing frame being mounted to two side planes beside the ball rolling duct of the nut of one embodiment of the present invention.

With reference to FIGS. 2, 3 and 6 again, at least one side of the connecting section 21 of the circulation tube 20 (there are two opposite sides in this embodiment) has a positioning wing frame 60 disposed against a side plane 111 of the nut 11 (as shown in FIGS. 2 and 6, the two side planes are outside of the ball rolling duct 12) or the positioning wing frame 60 is embedded inside the ball rolling duct 12 of the nut 11 (as shown in FIG. 9).

A positioning press board 70 is positioned and locked on the side plane 111 by a locking member 71, and the positioning press board 70 has an edge portion 72 for tightly pressing the positioning wing frame 60. The above mentioned embedded embodiment is further illustrated in FIG. 9. The positioning wing frame 60 is embedded into the nut 11 and aligned with the side plane 111 thereof, so that a top surface of the positioning wing frame 60 and the side planes 111 (outside of the ball rolling duct 12) of the nut 11 can maintain on the same level.

In terms of the technical features and the embodiments shown in the structures of FIGS. 1-3 and 4-6, the circulation device A of the present invention is mounted to the corresponding position in the ball rolling duct 12 formed between the nut 11 and the screw 10. The cover plate 40, 40' close the opening 30, 30' of the circulation tube 20, 20' first, then the corresponding ends of the two connection sections 21, 21' of the two circulation tubes 20, 20' are connected with each other, and then the two U-shaped circulators which are substantially inverted relative to each other and constructed by the two circulation tubes 20, 20' are assembled into the ball rolling duct 12. At this moment, upper half portions of the two circulation tubes 20, 20' protrude above a surface of the nut 11.

The opening 30, 30' can be formed around the curved section 23, 23' of the circulation tube 20, 20', no matter remote from or near the nut 11. However, it would be preferred that the opening may be formed on a side of the curved section close to a center of curvature of the curved section (that is, the opening is near the nut, and the circulation tube would have no significant discontinuity while the balls are running in the circulation tube).

Figure 5:
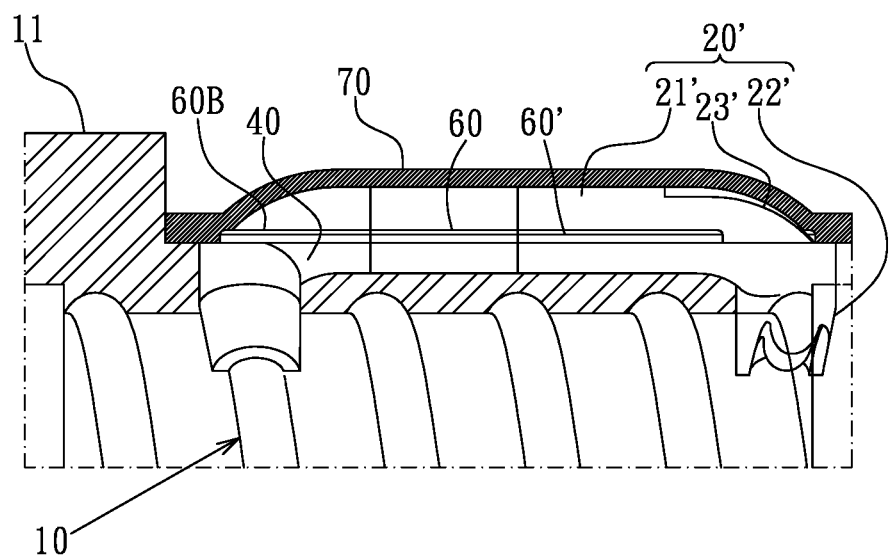
FIG. 5 is a partial side view showing the circulation tube in assembled state of the present invention (note: wherein a positioning press plate is shown in a cross-sectional view)
Figure 6:
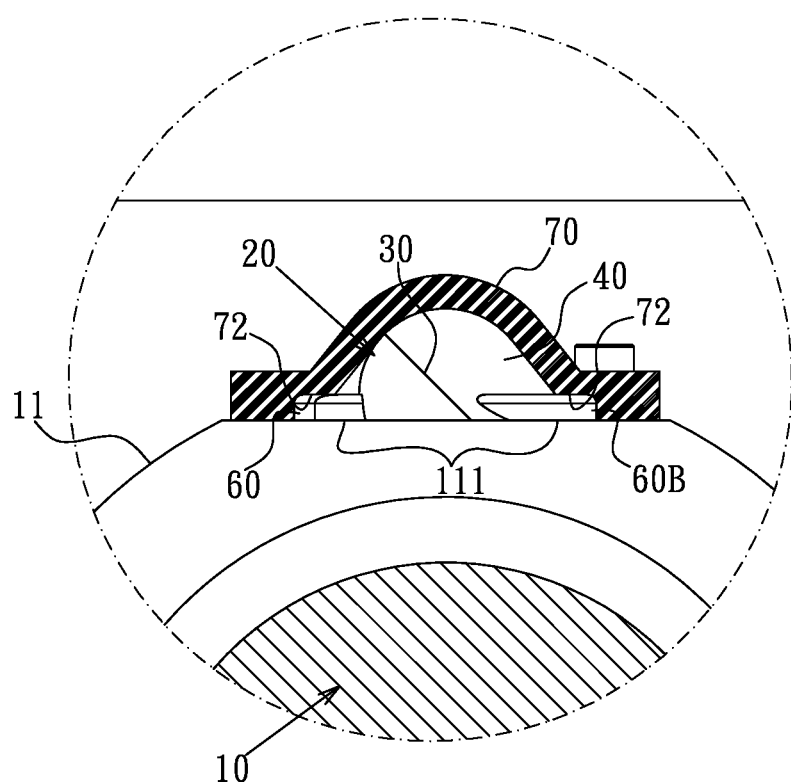
FIG. 6 is another partial side view showing the circulation tube in assembled state of the present invention (note: wherein the positioning press plate is shown in a cross-sectional view)

The positioning press board 70 is positioned and locked on the side plane 111 (out of the ball rolling duct 12) of the nut 11 by the locking member 71 (such as screws). Simultaneously, the edge portion 72 of the positioning press board 70 will tightly press against the positioning wing frame 60, 60' of the circulation tube 20, 20' (as shown in FIGS. 5 and 6), so that the positioning wing frame 60, 60' is firmly clamped and positioned between the positioning press board 70 and the side plane 111 of the nut 11. Therefore, the two circulation tubes 20, 20' can stay in stable status without displacement and rotation, and a vibration force generated during the rolling of the balls in the circulation tube 20, 20' is indirectly transmitted to the locking member 71 of the positioning press board 70. Thus, the vibration magnitude of the locking member 71 can be greatly reduced, and the circulation tube can be firmly locked and positioned.

In terms of the structural strength of the circulation device A, the cover plates 40, 40' are disposed on the circulation tube 20, 20' correspondingly to the openings 30, 30' of the circulation tube 20, 20' based on the feasibility of the injection molding production. Compared to the conventional two half-tube combination, the connection section 21, 21' and the ball engagement section 22, 22' of the circulation tube 20, 20' of the invention are preferred rigid tubular, so that the rigidity and force resisting strength thereof can be greatly improved, and the structure of the invention is able to withstand the strong pressure generated during the ball rolling process.

It should be noted that the positioning wing frame 60, 60' formed on the lateral sides of the circulation tube 20, 20' is provided for allowing the edge portion 72 of the positioning press board 70 to tightly press and position the positioning wing frame 60, 60'. The positioning wing frame 60, 60' does not need to extend to the ball engagement section 22, 22'; instead, the positioning wing frame 60, 60' only needs to form an extending straight rib on lateral portion of the connecting section 21, 21' of the circulation tube 20, 20' so as to securely position the circulation tube 20, 20' by a press effect. Therefore, practically the present invention is very simple and easy to be manufactured in mass production, and the present invention can achieve a preferable precision.

Figure 7:
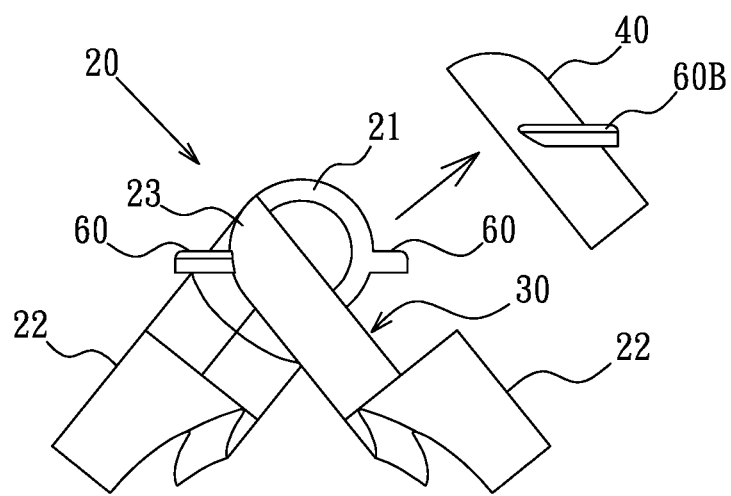
FIG. 7 is a partial side view showing the cover plate being mounted to a lateral side of an upper half portion of the curved section of the circulation tube of one embodiment of the present invention.
Figure 8:
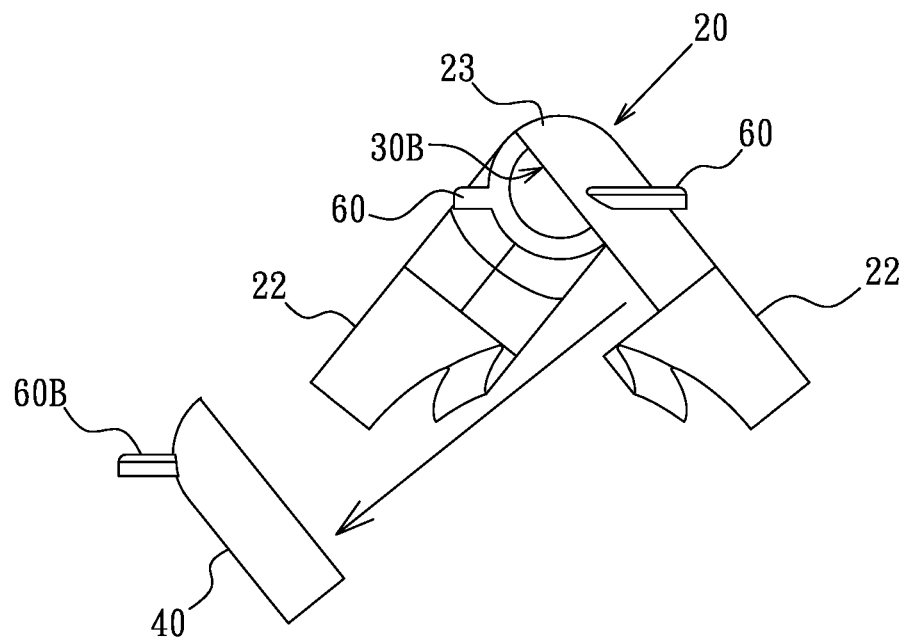
FIG. 8 is a partial side view showing the cover plate being mounted to a lateral side of a lower half portion of the curved section of the circulation tube of one embodiment of the present invention.

As shown in FIG. 7, this embodiment shows that the opening 30 is on a side of the curved section 23 of the circulation tube 20 remote from the nut 11. In the other embodiment as shown in FIG. 8, the opening 30 is on a side of the curved section 23 of the circulation tube 20 near the nut 11.

As shown in FIGS. 2 and 3 again, the connecting section 21, 21' of the circulation tube 20, 20' has a positioning wing frame 60, 60' on both sides, and a side of the cover plate 40, 40' on the curved section 23, 23' has a positioning wing plate 60B, 60B', wherein the positioning wing plate 60B, 60B' is used to connect with the positioning wing frame 60, 60' of the connecting section 21, 21' of the circulation tube 20, 20'.

The positioning wing plate 60B, 60B' of the cover plate 40, 40' on the curved section 23, 23' and the positioning wing frame 60, 60' of the connecting section 21, 21' of the circulation tube 20, 20' extend along a same straight line, that is, the positioning wing plate 60B, 60B' is aligned with the positioning wing frame 60, 60' of the connecting section 21, 21' of the circulation tube 20, 20', explanatory.

Figure 3:
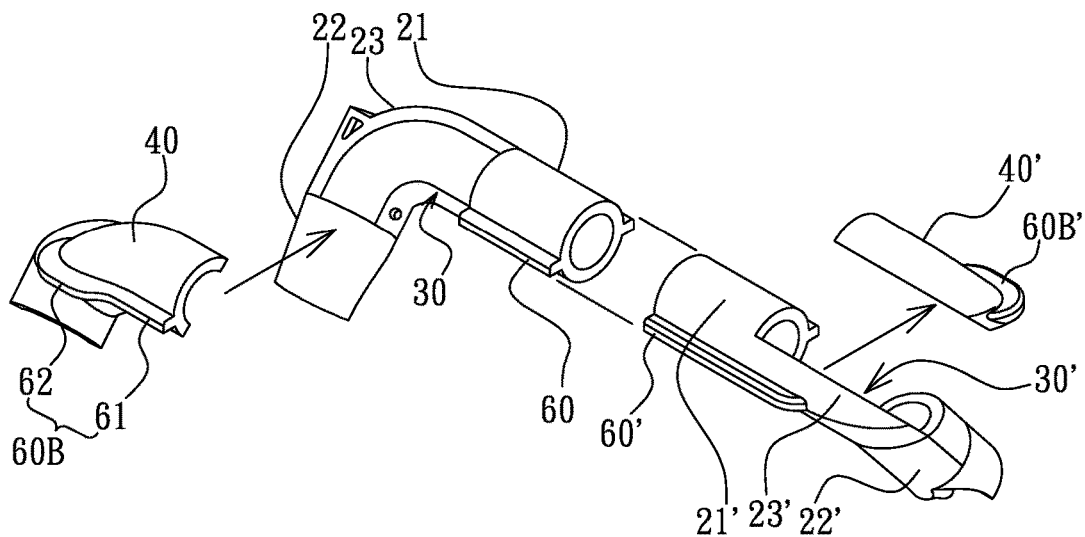
FIG. 3 is an exploded schematic view showing a cover plate and a circulation tube of the present invention.

As shown in FIG. 3, taking the circulation tube 20 for explanation, the positioning wing plate 60B of the cover plate 40 also includes a head section 61 and an expanded tail section 62, wherein the head section 61 is connected to the positioning wing frame 60 of the connecting section 21 of the circulation tube 20, the expanded tail section 62 having enlarged press area is connected to the head section 61 and extends to an end of the cover plate 40, wherein the expanded tail section 62 has a wing with a radial area expansion. The positioning wing plate 60B in this embodiment can be in a preferred stable positioning state.

Figure 4:
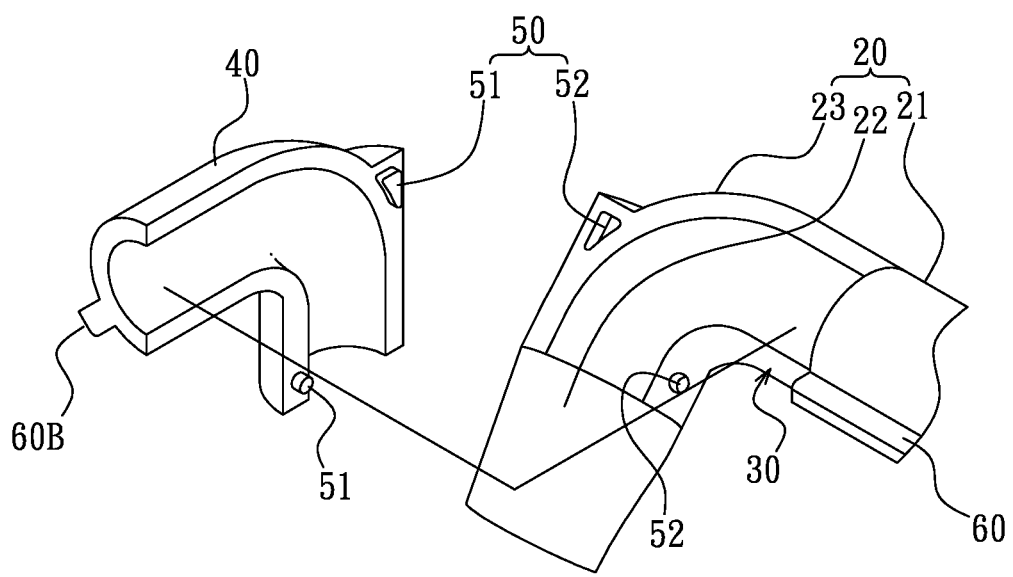
FIG. 4 is another exploded view showing the cover plate of the present invention.

As shown in FIG. 4, the cover plate 40 has an interlocking unit corresponding to an interlocking portion formed on the opening 30 so that the cover plate 40 is able to be tightly positioned. Wherein, the interlocking unit can be a plurality of projections 51 and recesses 52 mutually and tightly connected with each other. Specifically, in this embodiment, the cover plate 40 has two said projections 51, and the opening 30 is formed with two said recesses 52. The shape of the two projections 51 can be cylindrical and triangle respectively. The two projections 51 are distributed on an inner side and an outer side of the cover plate 40 respectively. The two recesses 52 are formed in shapes corresponding to the shapes of the two said projections 51. Of course, the numbers, positions and shapes of the two projections 51 and the two recesses 52 may be variable in other embodiments, which are not limited in this embodiment.

Figure 2:
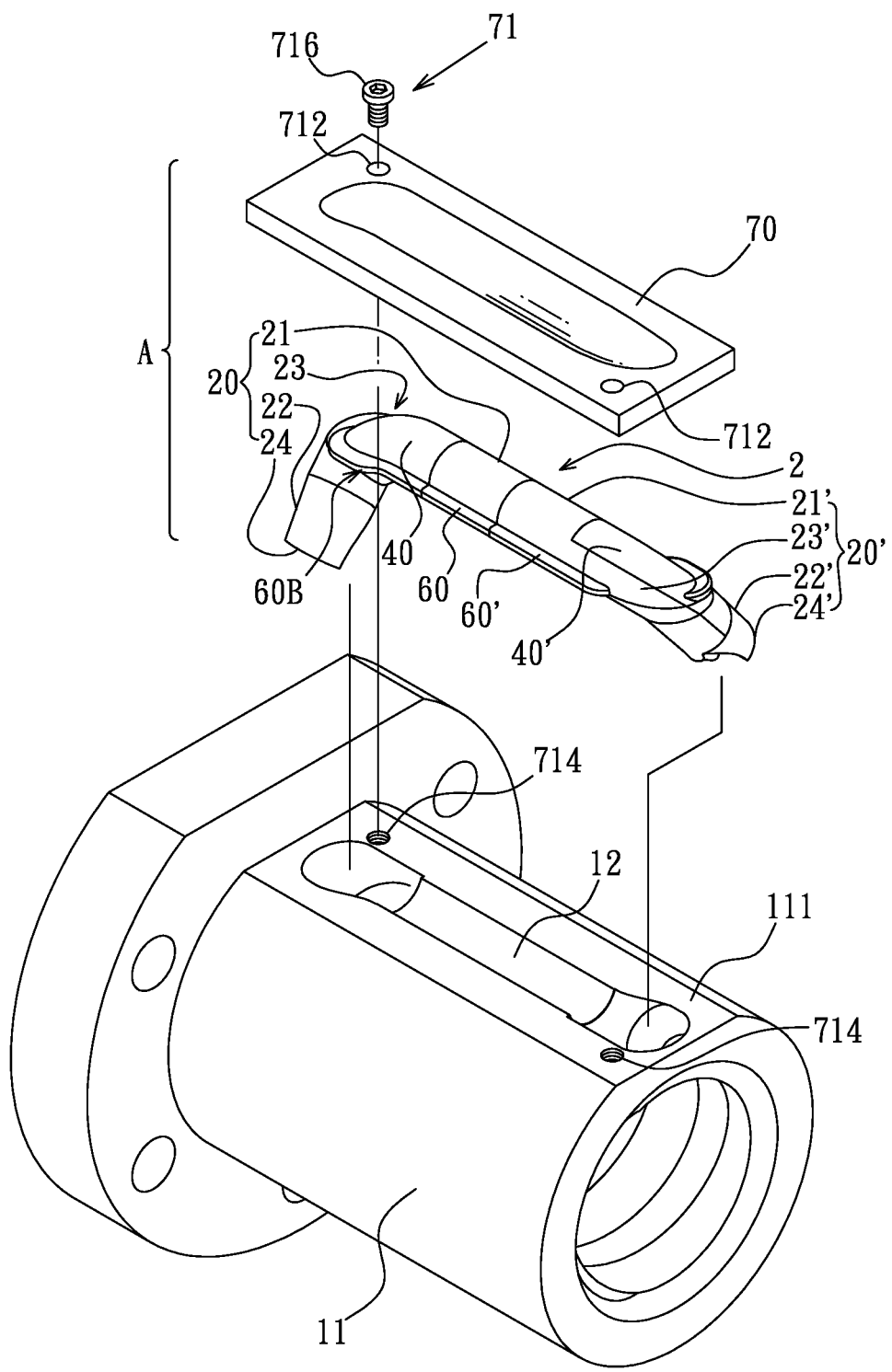
FIG. 2 is an exploded schematic view showing the components of the preferred embodiment of the present invention.

As shown in FIG. 2, the locking member 71 is provided for locking the positioning press board 70 on the nut 11.

The positioning press board 70 is formed with a plurality of through holes 712, a plurality of screw holes 714 are formed on the nut 11 correspondingly to the through holes 712, and a plurality of screws 716 are disposed through the through holes 712 and locked into the multiple screw holes 714. However, in other embodiments, the screw holes can be directly formed in the circulation tube for bolts locking and fixing, which means that the positioning press board is not the only embodiment of the present invention.

Figure 3A:
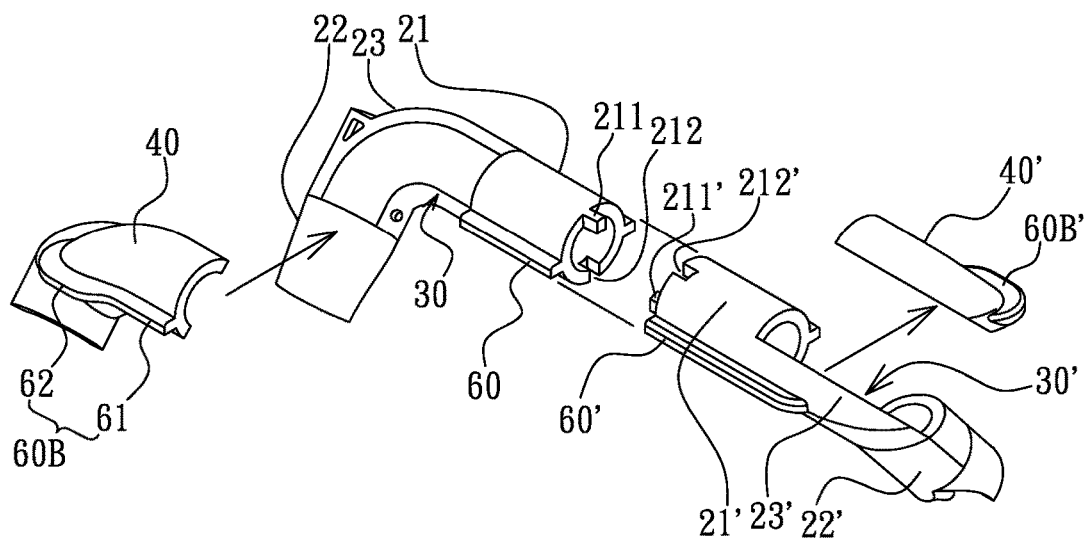
FIG. 3A is an exploded view showing that the connecting section of the circulation tube tightly interlocks with the connecting section of the other circulation tube.

A contact area between the two connecting sections 21, 21' of the two circulation tubes 20, 20' can be flat-cut, slant or dentate. In an embodiment as shown in FIG. 3A, there are a plurality of flanges 211, 211' and recessed grooves 212, 212' provided at the contact area of each connecting sections (21 or 21') and then engaged with each other therebetween. Therefore, the connecting section 21 of the circulation tube 20 can tightly interlock with an opposing connecting section 21' of the other circulation tube 20'.

Figure 11:
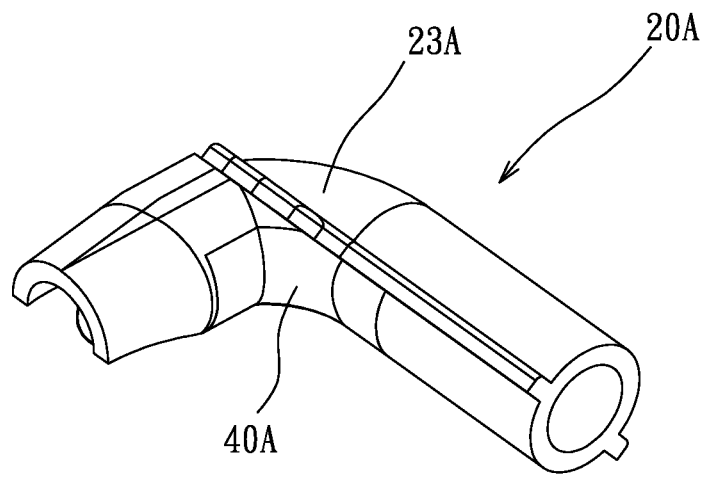
FIGS. 11 and 12 are views showing an alternative embodiment of a circulation tube of the present invention.
Figure 12:
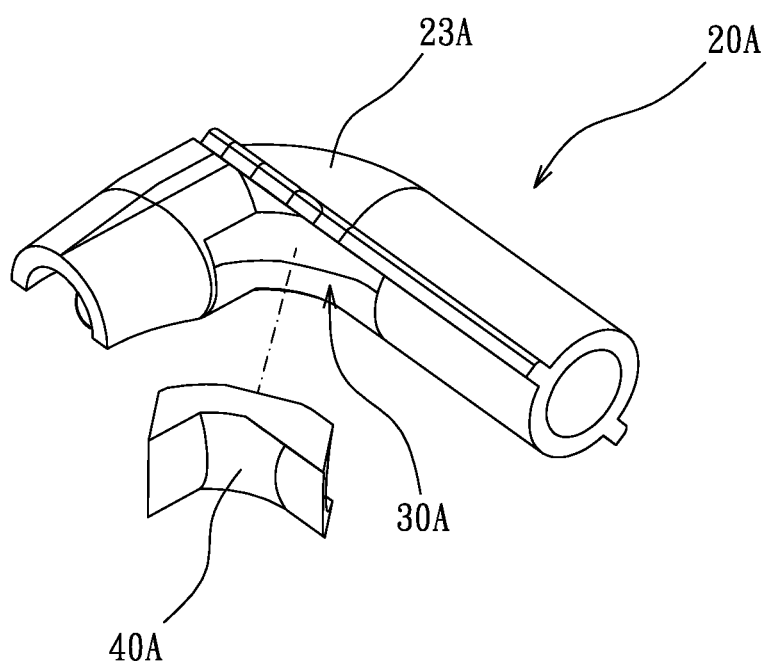

As shown in FIGS. 11 and 12, a ball returning circulator may have an opening 30A located in a curved section 23A of a circulation tube 20A, and the opening 30A opens at an inner curved side of the circulation tube 20A and is for disposing toward the nut. A cover plate 40A closes the opening 30A and is to be clamped between the nut and the curved section 23A. That is, the opening 30A is formed on a side of the curved section 23A close to a center of curvature of the curved section 23A, so that the opening 30A is near the nut, and the circulation tube 20A would have no significant discontinuity while the balls are running in the circulation tube 20A.

Compared with the above-mentioned conventional structures in the prior art, the circulator disclosed in the present invention uses the unique structure and the technical features of the circulation tube, the curved section, the opening and the cover plate on the curved section to greatly increase the force-resisting strength of the circulation device of the ball screw and effectively improve the durability and quality of the circulation device.

In other aspects, another technical feature is that the positioning wing frame (or plate) has to cooperate with the positioning press board. The positioning press board has an edge portion for tightly pressing the positioning wing frame of the circulation tube so that the positioning wing frame of the circulation tube is firmly clamped and positioned between the positioning press board and the side plane of the nut. Therefore, the two circulation tubes can be firmly mounted in the ball screw without displacement and rotation and the positioning stability of the circulation device assembly in the ball screw can be greatly increased.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A ball returning circulator of a ball screw having a nut, a screw and a plurality of balls, the ball returning circulator comprising:
    at least one ball access port, each of the at least one ball access port at one end of the circulator for releasing balls to come into or out from the circulator; and
    at least one curved section having at least one opening distanced from the ball access port and at least one cover plate for closing the at least one opening;
    wherein the ball returning circulator comprises two circulation tubes, each of the circulation tubes has one said ball access port, a connecting section, one said curved section and a ball engaging section, each said curved section having the opening is between the connecting section and the ball engaging section, and the connecting section of the circulation tube has at least one positioning wing frame on at least one side thereof.

2. The ball returning circulator of claim 1, wherein each said opening is formed on a side of each said curved section close to a center of curvature of the curved section.

3. The ball returning circulator of claim 1, wherein the cover plate has an interlocking unit correspondingly assembled to an interlocking portion formed on the curved section and near the opening so that the cover plate is able to be tightly positioned.

4. The ball returning circulator of claim 1, wherein the ball access port and the at least one curved section is integrally formed as a single piece.

5. The ball returning circulator of claim 1, wherein the connecting section of one of the circulation tubes oppositely tightly interlocks with the connecting section of the other of the circulation tubes.

6. The ball returning circulator of claim 1, wherein at least one said positioning wing frame is disposed against a side plane of the nut or embedded into the side plane of the nut.

7. The ball returning circulator of claim 6, wherein the cover plate has a positioning wing plate, the positioning wing plate and the positioning wing frame of the connecting section of the circulation tube extend along a same straight line.

8. The ball returning circulator of claim 7, wherein the positioning wing plate of the cover plate comprises a head section and an expanded tail section radially expanding in area, the head section is connected to the positioning wing frame of the connecting section of the circulation tube, and the expanded tail section is connected to the head section and extends to an end of the cover plate.

* * * * *